US008769989B2

(12) United States Patent
Mitsugi et al.

(10) Patent No.: US 8,769,989 B2
(45) Date of Patent: Jul. 8, 2014

(54) CLEAVING APPARATUS FOR A BAND-LIKE GLASS FILM AND CLEAVING METHOD FOR A BAND-LIKE GLASS FILM

(75) Inventors: Kaoru Mitsugi, Otsu (JP); Naohiro Ikai, Otsu (JP); Hiroshi Adachi, Otsu (JP); Hiroki Mori, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 48 days.

(21) Appl. No.: 13/296,583

(22) Filed: Nov. 15, 2011

(65) Prior Publication Data

US 2012/0131962 A1 May 31, 2012

(30) Foreign Application Priority Data

Nov. 22, 2010 (JP) ................................. 2010-260275

(51) Int. Cl.
*C03B 21/02* (2006.01)
(52) U.S. Cl.
CPC ...................................... *C03B 21/02* (2013.01)
USPC .................................................. 65/97; 65/90
(58) Field of Classification Search
CPC ........ C03B 21/02; C03B 21/04; C03B 21/06; C03B 27/0404; C03B 27/048
USPC ...................... 65/90–101, 25.1–26
See application file for complete search history.

(56) References Cited

U.S. PATENT DOCUMENTS 3,453,097 A   7/1969  Häfner
4,544,395 A * 10/1985 Evans ............................. 65/60.3
4,749,400 A *  6/1988  Mouly et al. ....................... 65/97
6,220,056 B1 *  4/2001  Ostendarp ......................... 65/175
6,423,930 B1 *  7/2002  Matsumoto ................ 219/121.69
7,005,317 B2 *  2/2006  Chin et al. ..................... 438/106
7,337,633 B2 *  3/2008  Shiraishi et al. ............... 65/25.2

(Continued)

FOREIGN PATENT DOCUMENTS

EP      1 690 835        8/2006
JP      60-076318        4/1985

(Continued)

OTHER PUBLICATIONS

International Search Report issued Jan. 10, 2012 in corresponding International (PCT) Application No. PCT/JP2011/076227.

(Continued)

*Primary Examiner* — Jodi C Franklin
(74) *Attorney, Agent, or Firm* — Wenderoth, Lind & Ponack, L.L.P.

(57) ABSTRACT

A cleaving apparatus holds at least one surface (effective surface) of a band-like glass film in a non-contact state to suppress a situation that wavy portions reach a region in which the band-like glass film is to be cleaved. The cleaving apparatus cleaves the band-like glass film, which is being conveyed in a longitudinal direction thereof, along a conveyance direction thereof using a thermal stress generated through localized heating and cooling of a heated region. The localized heating and the cooling is performed on a preset cleaving line extending along the conveyance direction of the band-like glass film. The cleaving apparatus includes an air knife for supplying air to a front surface of the band-like glass film to retain the film on a conveyor at a position on an upstream side of a cleaving region in the conveyance direction.

19 Claims, 3 Drawing Sheets

(56) References Cited

U.S. PATENT DOCUMENTS

| | | | |
|---|---|---|---|
| 8,051,679 B2* | 11/2011 | Abramov et al. | 65/112 |
| 2001/0020375 A1* | 9/2001 | Novack et al. | 65/485 |
| 2002/0066292 A1* | 6/2002 | Wang | 65/382 |
| 2003/0172547 A1* | 9/2003 | Shephard, II | 34/611 |
| 2003/0180558 A1* | 9/2003 | MacQueen et al. | 428/474.4 |
| 2005/0101109 A1* | 5/2005 | Chin et al. | 438/464 |
| 2006/0112875 A1* | 6/2006 | Huh et al. | 118/712 |
| 2006/0191970 A1 | 8/2006 | Kataoka et al. | |
| 2007/0169849 A1* | 7/2007 | Yahagi et al. | 144/366 |
| 2008/0264994 A1 | 10/2008 | Herve et al. | |
| 2010/0107848 A1* | 5/2010 | Joseph et al. | 83/862 |
| 2010/0162761 A1* | 7/2010 | Carney et al. | 65/65 |
| 2010/0192634 A1* | 8/2010 | Higuchi et al. | 65/60.1 |
| 2010/0212361 A1 | 8/2010 | Abramov et al. | |
| 2010/0218557 A1* | 9/2010 | Aniolek et al. | 65/97 |
| 2011/0023548 A1* | 2/2011 | Garner et al. | 65/106 |
| 2011/0177290 A1 | 7/2011 | Tomamoto et al. | |
| 2011/0177325 A1 | 7/2011 | Tomamoto et al. | |
| 2011/0177347 A1 | 7/2011 | Tomamoto et al. | |
| 2011/0192878 A1 | 8/2011 | Teranishi et al. | |
| 2011/0200812 A1* | 8/2011 | Tomamoto et al. | 428/220 |
| 2011/0302965 A1* | 12/2011 | Aniolek et al. | 65/204 |
| 2012/0017642 A1* | 1/2012 | Teranishi et al. | 65/105 |
| 2012/0024928 A1* | 2/2012 | Matsumoto et al. | 225/2 |

FOREIGN PATENT DOCUMENTS

| | | |
|---|---|---|
| JP | 04-356337 | 12/1992 |
| JP | 08-175726 | 7/1996 |
| JP | 2000-109252 | 4/2000 |
| JP | 2003-034545 | 2/2003 |
| JP | 2010-132531 | 6/2010 |
| JP | 2010-195676 | 9/2010 |
| JP | 2010-232603 | 10/2010 |

OTHER PUBLICATIONS

International Preliminary Report on Patentability and Written Opinion of the International Searching Authority mailed Jun. 20, 2013 in International (PCT) Application No. PCT/JP2011/076227.
Supplementary European Search Report issued Nov. 7, 2013 in corresponding European Patent Application No. 11843737.5.

* cited by examiner

Fig. 5A1
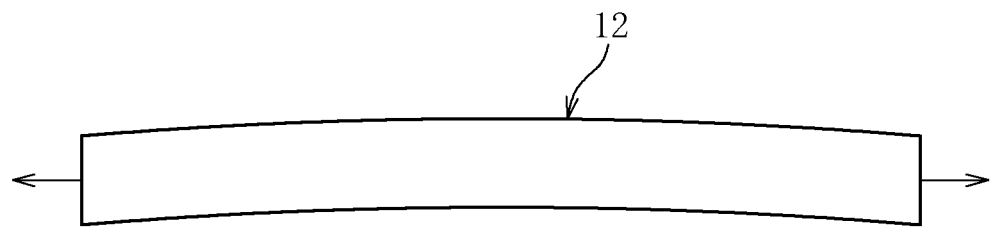
Fig. 5A2
Fig. 5B1
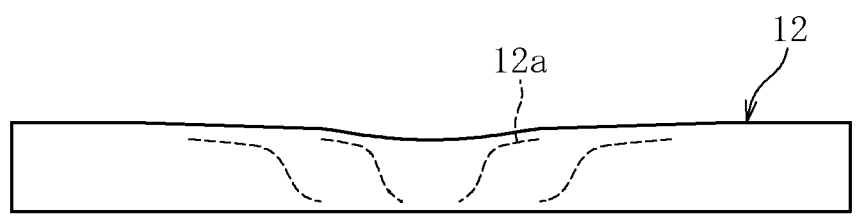
Fig. 5B2

CLEAVING APPARATUS FOR A BAND-LIKE GLASS FILM AND CLEAVING METHOD FOR A BAND-LIKE GLASS FILM

TECHNICAL FIELD

The present invention relates to a technology for cleaving a band-like glass film, which is to be used for a flat panel display, a solar cell, an organic light-emitting diode (OLED) illumination device, or the like, along a conveyance direction thereof.

BACKGROUND ART

In recent years, flat panel displays (FPDs) have become mainstream as image display devices, the FPDs being typified by a liquid crystal display, a plasma display, an OLED display, and the like. Further, progress is being made toward reduction in weight of those FPDs. Therefore, glass substrates to be used for the FPDs are also currently becoming thinner (formed as a glass film).

Further, there is a growing use of an organic light-emitting diode as a plane light source for interior illumination, which emits only monochrome (for example, white) light. When this type of illumination device includes a glass substrate having flexibility, a light-emitting surface of the illumination device is freely deformable. Therefore, from the viewpoint of ensuring sufficient flexibility, it is also promoted to further thin the glass substrate to be used for the illumination device.

A glass substrate that is thinned to have a thickness of 300 µm or less (glass film) is generally obtained by forming a band-like glass film and then cutting the band-like glass film into a predetermined size. The band-like glass film has flexibility to such a degree that the band-like glass film is not broken even when the band-like glass film is rolled around a roll core, and accordingly the band-like glass film can be rolled into a roll shape to serve as a glass roll. When the band-like glass film is rolled into a roll shape as described above, processing of cutting the band-like glass film into a predetermined width and various kinds of film formation processing can be performed in a roll-to-roll process (process of unrolling one glass roll to obtain the band-like glass film and simultaneously rolling the glass film subjected to various kinds of processing into another glass roll). As a result, production efficiency of displays and illumination devices can be enhanced greatly.

The glass roll to be charged into production equipment (roll-to-roll process) for displays and illumination devices is obtained in the following manner. That is, in a band-like glass film, which is formed of molten glass into a thin sheet shape by an overflow downdraw method or a slot downdraw method, unnecessary portions at both widthwise ends thereof (selvage portions) are cut (primary cutting processing), and the resultant band-like glass film is rolled around a core (see Patent Literature 1). Further, if necessary, the glass roll that is formed and rolled by the above-mentioned method is charged into the roll-to-roll process and cut into a desired width (secondary cutting processing).

For the primary cutting processing and the secondary cutting processing, for example, a cutting method involving laser cleaving is employed. In the method involving the laser cleaving, the band-like glass film is successively cleaved by propagating, along a preset cleaving line extending in a conveyance direction of the band-like glass film, an initial crack formed at a leading end portion of the preset cleaving line using a thermal stress generated in the band-like glass film through localized heating using a laser and cooling of a heated region resulting from the localized heating, which are performed along the preset cleaving line.

CITATION LIST

Patent Literature 1: JP 2010-132531 A
Patent Literature 2: JP 2000-109252 A
Patent Literature 3: JP 8-175726 A
Patent Literature 4: JP 60-076318 A

SUMMARY OF INVENTION

Technical Problems

By the way, the above-mentioned laser cleaving may cause, during the successive cleaving of the band-like glass film, a situation that the crack in the cleaved portion deviates from the preset cleaving line and meanders so that the cut surface (cleaved surface) of the band-like glass film becomes rough, or a situation that the crack in the cleaved portion departs from the preset cleaving line so that the crack is propagated in a width direction of the band-like glass film. Further, there arises a problem in that the laser cleaving of the band-like glass film stops due to the above-mentioned situations. This is because the band-like glass film becomes wavy in its cleaved region for the following reasons.

That is, the first reason is that the band-like glass film formed by the overflow downdraw method or the slot downdraw method slightly meanders in the width or thickness direction thereof. Specifically, the band-like glass film in plan view is not completely straight in a length direction thereof but slightly curved, or the band-like glass film in side view is not completely flat but wavy in an entire or partial widthwise region. Further, the second reason is that slight misalignment occurs in a conveyance device. Specifically, shafts of guide rollers are misaligned or the degree of linear motion of a conveyor is deteriorated so that creases are generated in the band-like glass film.

In this case, when the material of the film is a web material having stretchability, such as a resin, even if distortions or creases are generated for any one of the reasons described above, the band-like film is conveyed while applying an appropriate tensile force so that the apparent distortions or creases are eliminated and thus the wavy portions of the band-like film during the conveyance can be eliminated. However, the stretchability of the band-like glass film is extremely low, and hence, even when the band-like film is conveyed while applying the tensile force, the apparent distortions or creases of the band-like glass film are not eliminated. On the contrary, the wavy portions of the band-like glass film may further be developed.

For example, in a case where a band-like glass film 12 in plan view, which is being conveyed, is not completely straight in the length direction of the band-like glass film but curved as illustrated in FIG. 5A1, and the band-like glass film 12 in side view extends in a straight line as illustrated in FIG. 5A2, when a tensile force is applied in the conveyance direction as indicated by the arrows of FIG. 5A1, the band-like glass film 12 assumes the following form. That is, as illustrated in FIG. 5B1, distortions or creases are generated in the vicinity of the longitudinal center portion of the band-like glass film 12 in plan view, and as illustrated in FIG. 5B2, the distortions or creases appear as wavy portions 12a in the vicinity of the longitudinal center portion of the band-like glass film 12 in side view.

As a method of smoothing the creases of the web, many kinds of crease smoothing rollers or crease smoothing devices are proposed (see Patent Literatures 2 to 4). However, all the above-mentioned crease smoothing rollers or devices are provided to eliminate only the creases generated in the width direction of the web, and do not have any effect of smoothing the creases (wavy portions) which may be generated in the conveyance direction of the band-like glass film during the conveyance thereof.

Further, there may be conceived a method of nipping the band-like glass film between nip rollers to prevent a situation that the wavy portions of the band-like glass film reach the cleaving region. In this case, however, both surfaces of the band-like glass film are brought into contact with the nip rollers, which leads to a problem in that the band-like glass film is soiled or damaged on an effective surface (surface to be subjected to various kinds of processing such as film formation) thereof.

In view of the above-mentioned circumstances, the present invention has a technical object to provide a cleaving apparatus for a band-like glass film and a cleaving method for a band-like glass film, in which at least one surface (effective surface) of the band-like glass film is held in a non-contact state to suppress a situation that wavy portions reach a region in which the band-like glass film is to be cleaved.

Solution to Problems

In order to achieve the above-mentioned object, the present invention provides a cleaving apparatus for a band-like glass film, which is configured such that the band-like glass film, which is being conveyed in a longitudinal direction thereof, is cleaved along a conveyance direction thereof using a thermal stress generated through localized heating and cooling of a heated region resulting from the localized heating, the localized heating and the cooling being performed on a preset cleaving line extending along the conveyance direction of the band-like glass film, the cleaving apparatus including: support means for supporting a back surface side of the band-like glass film; and air supply means for supplying air to a front surface of the band-like glass film while supporting, by the support means, the back surface side of the band-like glass film to retain the band-like glass film on the support means at a position on an upstream side of a cleaving region in the conveyance direction, the cleaving region being defined as a region in which the band-like glass film is to be cleaved.

With this structure, the band-like glass film is retained on the support means with the air so that the wavy portions can be kept on the upstream side of the position at which the band-like glass film is retained. Thus, it is possible to suppress the situation that the wavy portions reach the cleaving region for the band-like glass film situated on the downstream side of the position described above. Accordingly, it is possible to effectively avoid the situation that may occur during the cleaving of the band-like glass film, that is, the situation that the crack in the cleaved portion deviates from the preset cleaving line and meanders so that the cleaved surface becomes rough, or the situation that the crack in the cleaved portion departs from the preset cleaving line so that the crack is propagated in the width direction of the band-like glass film. Further, one surface (front surface) of the band-like glass film, to which the air is blown from the air supply means so as to retain the band-like glass film, is held in a non-contact state. Thus, troubles such as soiling or damaging to the one surface do not easily occur. Note that, it is preferred that the conveyance direction of the band-like glass film be a lateral direction. In this case, the "lateral direction" does not only include the horizontal direction, but also includes an inclined direction in which the downstream side of the conveyance direction is inclined downward, and an inclined direction in which the downstream side of the conveyance direction is inclined upward.

In the above-mentioned structure, it is preferred that a width of air supply from the air supply means be set larger than a width of the band-like glass film.

With this structure, the entire widthwise region of the band-like glass film can be retained with the air from the air supply means, and thus the effect of suppressing the situation that the wavy portions reach the cleaving region is more reliably obtained.

In any one of the above-mentioned structures, it is preferred that the air supply means be an air knife.

With this structure, the air supply means is the air knife. Thus, it is possible to intensively retain only the portion of the band-like glass film intended to be retained, and to reduce the total flow rate of air to be supplied.

In any one of the above-mentioned structures, it is preferred that the air supply means blow the air in a direction from a position spaced away from the front surface of the band-like glass film on a downstream side in the conveyance direction of the band-like glass film toward a position on the front surface of the band-like glass film on an upstream side in the conveyance direction of the band-like glass film.

With this structure, it is possible to suppress an adverse effect that is caused when the air supplied from the air knife flows toward the downstream side in the conveyance direction of the band-like glass film. As the adverse effect, unstable cleaving is taken as an example, in which the band-like glass film vibrates due to the fact that the air flowing toward the downstream side in the conveyance direction enters the opposite surface side through the cleaved portion of the band-like glass film.

In any one of the above-mentioned structures, it is preferred that the air supply means be an air float table.

With this structure, the band-like glass film is supported in a non-contact state by the air float table, and hence friction is virtually negligible during the conveyance of the band-like glass film. Accordingly, the band-like glass film having the wavy portions generated therein is easily stretchable when the band-like glass film is retained with the air from the air supply means, with the result that a remarkable effect of suppressing the wavy portions can be obtained. Further, both surfaces of the band-like glass film can be held in a non-contact state, and thus it is possible to suppress soiling or damaging to both the surfaces of the band-like glass film.

Further, in order to achieve the above-mentioned object, the present invention provides a cleaving method for a band-like glass film, in which the band-like glass film, which is being conveyed in a longitudinal direction thereof, is cleaved along a conveyance direction thereof using a thermal stress generated through localized heating and cooling of a heated region resulting from the localized heating, the localized heating and the cooling being performed on a preset cleaving line extending along the conveyance direction of the band-like glass film, the cleaving method including: supporting, by support means, a back surface side of the band-like glass film; and supplying, by air supply means, air to a front surface of the band-like glass film while supporting, by the support means, the back surface side of the band-like glass film to retain the band-like glass film on the support means at a position on an upstream side of a cleaving region in the conveyance direction, the cleaving region being defined as a region in which the band-like glass film is to be cleaved.

The constituent features of this method are substantially the same as those of the apparatus according to the present invention, which is described in the beginning of this section. Hence, the matters including the action and effect are substantially the same as those already described with regard to this apparatus.

Advantageous Effect of Invention

As described above, according to the present invention, the situation that the wavy portions reach the region in which the band-like glass film is to be cleaved can be suppressed with at least one surface of the band-like glass film held in a non-contact state. Thus, it is possible to effectively avoid, with appropriate protection of the effective surface (front surface) of the band-like glass film, the troubles that may occur during the cleaving of the band-like glass film, for example, the trouble that the crack in the cleaved portion deviates from the preset cleaving line and meanders or departs from the preset cleaving line.

BRIEF DESCRIPTION OF DRAWINGS

FIG. 5A1 A schematic plan view of a band-like glass film before a tensile force is applied.

FIG. 5A2 A schematic side view of the band-like glass film before the tensile force is applied.

FIG. 5B1 A schematic plan view of the band-like glass film after the tensile force is applied.

FIG. 5B2 A schematic side view of the band-like glass film after the tensile force is applied.

DETAILED DESCRIPTION OF THE INVENTION

Hereinafter, an embodiment of the present invention is described with reference to the drawings.

Figure 1A:
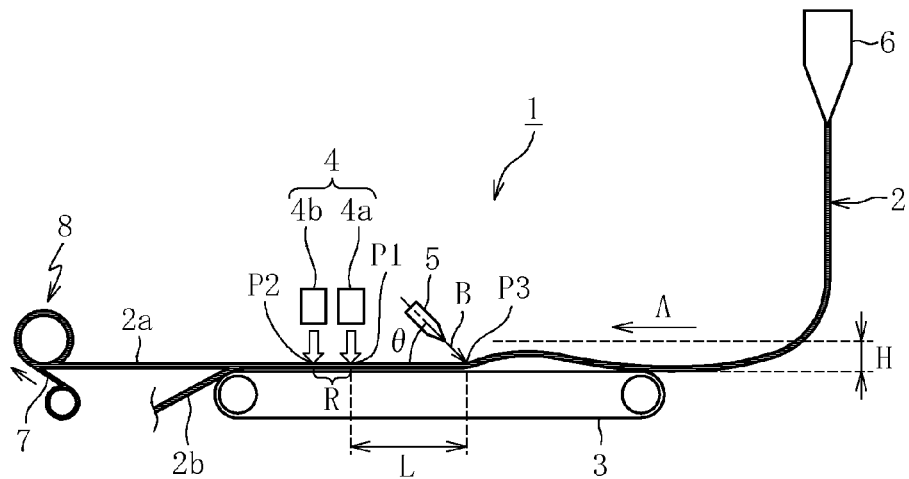
FIG. 1A A side view illustrating a structural example of a cleaving apparatus for a band-like glass film according to an embodiment of the present invention.
Figure 1B:
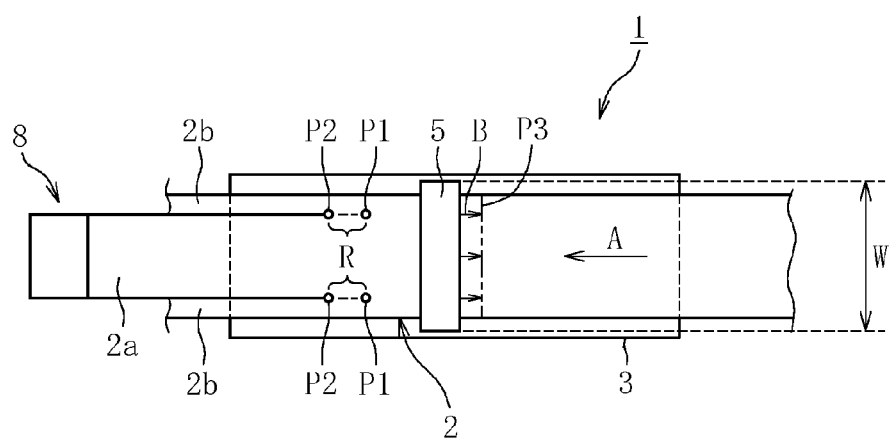
FIG. 1B A plan view illustrating the structural example of the cleaving apparatus for a band-like glass film according to the embodiment of the present invention.

FIGS. 1A and 1B schematically illustrate a structural example of a cleaving apparatus for a band-like glass film according to the embodiment of the present invention. As illustrated in FIGS. 1A and 1B, a cleaving apparatus 1 according to the embodiment of the present invention includes, as its main components, a conveyor 3 serving as support means for supporting a band-like glass film 2, thermal stress cleaving means 4 for cleaving the band-like glass film 2 using a thermal stress, and an air knife 5 serving as air supply means for supplying air.

In this embodiment, the band-like glass film 2 is formed by an overflow downdraw method. The band-like glass film 2 that is successively formed and conveyed downward from a forming trough 6 has its conveyance direction converted into a horizontal direction during the conveyance. Accordingly, the band-like glass film 2 is conveyed to the cleaving apparatus 1 in a lateral direction indicated by the arrow A (in this embodiment, horizontal direction or substantially horizontal direction). Then, under a state in which the band-like glass film 2 that has reached the cleaving apparatus 1 is supported by the conveyor 3, the band-like glass film 2 is cut by the thermal stress cleaving means 4 into an available film portion (band-like glass film portion serving as an end product) 2a and unnecessary selvage portions 2b at both ends of the band-like glass film 2. At this time, a speed of a conveyor belt of the conveyor 3 is synchronized with a conveyance speed of the band-like glass film 2. The available film portion 2a is rolled by a roll-up device 8 under a state in which a band-like protective film 7 including a resin film and the like is overlaid on the available film portion 2a. The selvage portions 2b are conveyed to a selvage portion processing device (not shown).

The thermal stress cleaving means 4 performs so-called laser cleaving, and is arranged above the conveyor 3. The thermal stress cleaving means 4 includes laser beam applying means 4a for performing localized heating at a heating position P1, and mist water jetting means 4b for performing cooling at a cooling position P2. The heating position P1 and the cooling position P2 are situated on a preset cleaving line extending along the conveyance direction of the band-like glass film 2. The thermal stress cleaving means 4 performs localized heating and cooling of a heated region resulting from the localized heating, to thereby generate a thermal stress in the band-like glass film 2. In accordance with the generation of the thermal stress, a crack is propagated along the preset cleaving line, and as a result, the band-like glass film 2 is successively cleaved. The region from the heating position P1 to the cooling position P2 corresponds to a cleaving region R, in which the band-like glass film 2 is to be cleaved.

The air knife 5 is disposed at a position that is spaced upward from the conveyor 3 and situated on an upstream side (i.e., a position upstream) of the thermal stress cleaving means 4 in the conveyance direction. An air blow direction from the air knife 5 to the band-like glass film 2 is set as a direction indicated by the arrow B, that is, a direction inclined from an upper downstream position of the band-like glass film 2 toward a lower upstream side thereof. Further, a width of air supply from the air knife 5 is set larger than the width of the band-like glass film 2. Accordingly, the band-like glass film 2 is retained on the conveyor 3 at a position P3 with the air from the air knife 5.

The cleaving apparatus 1 structured as described above produces the following effects.

Even when wavy portions are generated in the band-like glass film 2 on the upstream side of the position P3, the band-like glass film 2 is retained on an upper surface of the conveyor 3 and stretched at the position P3, with the result that the wavy portions are suppressed at the position P3. The position P3 is situated on the upstream side of the cleaving region R in the conveyance direction, and hence it is possible to suppress a situation that the wavy portions of the band-like glass film 2 reach the cleaving region R. Further, an upper surface of the band-like glass film 2, to which air is blown from the air knife 5, is held in a non-contact state. Thus, the upper surface of the band-like glass film 2 is not soiled or damaged.

Hereinafter, the air knife 5 is further described in detail.

An amount of air supply from the air knife 5 per unit area (1 $mm^2$) of an air supply port of the air knife 5 is preferably 0.1 l/min or more, further preferably 0.5 l/min or more. When the air supply amount is less than 0.1 l/min, the band-like glass film 2 cannot possibly be retained with air sufficiently. On the other hand, the air supply amount per unit area (1 $mm^2$) is, for example, less than 10 l/min. When the air supply amount is 10 l/min or more, equipment cost may unnecessarily increase due to capacity increase of an air supply source.

An inclination angle θ formed in side view between the air blow direction of the air knife 5 and the conveyance direction of the band-like glass film 2 is preferably 15° to 75°, further preferably 30° to 60°. When the inclination angle θ is less than 15°, the band-like glass film 2 cannot possibly be retained with air sufficiently. On the other hand, when the inclination angle θ exceeds 75°, the air supplied from the air knife 5 is likely to flow toward the downstream side. When the air flowing toward the downstream side enters a back surface side of the band-like glass film 2 through the cleaved portion of the band-like glass film 2, the band-like glass film 2 vibrates. Accordingly, part of the band-like glass film 2 in the cleaving region R vibrates, with the result that the cleaving may become unstable.

A distance L between the heating position P1 and the position P3 along the conveyance direction is preferably 50 mm to 1,000 mm, further preferably 100 mm to 500 mm. From the viewpoint of an installation space of the air knife 5, it is difficult to set the distance L to less than 50 mm. When the distance L exceeds 1,000 mm, the band-like glass film 2 may become wavy again in the region between the heating position P1 and the position P3.

A height H of the air supply port of the air knife 5 from the front surface of the conveyor belt of the conveyor 3 is preferably 3 mm to 50 mm, further preferably 5 mm to 20 mm. When the height H is less than 3 mm, in a case where the band-like glass film 2 slightly moves vertically due to vibrations or the like, the band-like glass film 2 may be brought into contact with a tip end of the air knife 5 and, as a result, the band-like glass film 2 may be damaged. When the height H exceeds 50 mm, air may be diffused and, as a result, the band-like glass film 2 might not be retained sufficiently.

A width W of air supplied from the air knife 5 is preferably 110% or more of the width of the band-like glass film 2. When the width W of air is less than 110% of the width of the band-like glass film 2, the ends of the band-like glass film might not be retained sufficiently, and therefore the wavy portions of the band-like glass film 2 might not be suppressed sufficiently. On the other hand, the width W of air is, for example, less than 150% of the width of the band-like glass film 2. When the width W of air is 150% or more of the width of the band-like glass film 2, the equipment cost may unnecessarily increase due to the capacity increase of the air supply source, and the installation space of the air knife 5 may unnecessarily increase.

Figure 2:
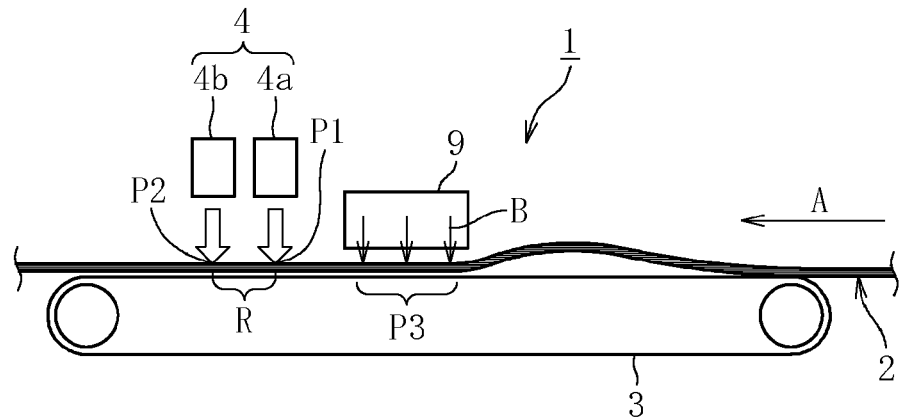
FIG. 2 A side view illustrating another example of air supply means.

The present invention is not limited to the above-mentioned embodiment. For example, other air supply means such as an air float device 9 illustrated in FIG. 2 may be used in place of the air knife 5. However, in the case of the air float device 9, in order to supply air at a flow rate of 0.1 l/min or more per unit area (1 mm$^2$) of the air supply port, an air supply source having a larger capacity than that of the air knife 5 is necessary. Further, in the case of the air float device 9, the air hitting against the band-like glass film 2 is likely to flow toward the downstream side, and hence the above-mentioned vibrations are likely to occur.

Figure 3:
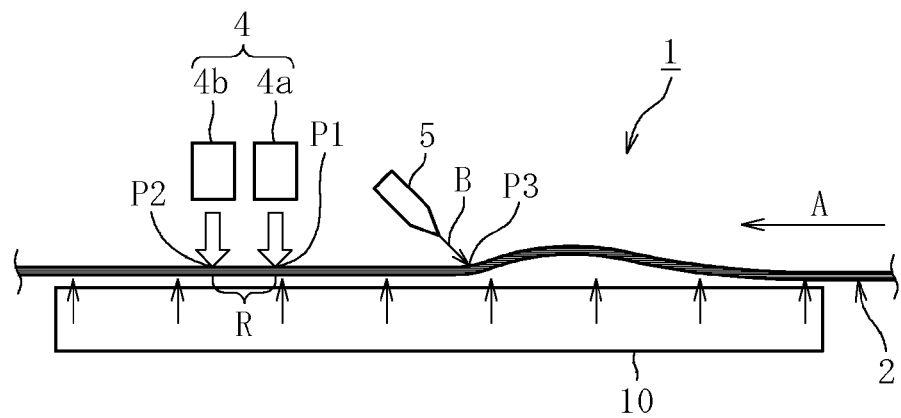
FIG. 3 A side view illustrating another example of support means.

Further, the support means for the band-like glass film 2 is not limited to the conveyor 3. For example, the support means may be a simple plate-like member such as a resin plate, or an air float table 10 illustrated in FIG. 3. However, in the case of the simple plate-like member, the plate-like member slides in contact with the band-like glass film 2, and hence the band-like glass film 2 may be damaged on the back surface side thereof. On the other hand, in the case of the air float table 10, the air float table 10 does not come into contact with the band-like glass film 2, and hence the band-like glass film 2 is not damaged on the back surface side thereof. Further, friction is virtually negligible, and hence, when the air from the air supply means hits against the band-like glass film 2, the band-like glass film 2 is easily stretchable, with the result that the effect of suppressing the wavy portions is enhanced.

Figure 4:
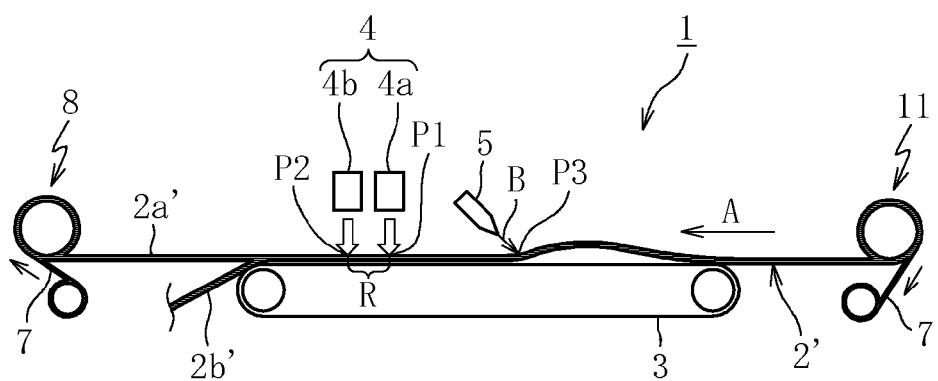
FIG. 4 A side view illustrating another use example of the cleaving apparatus for a band-like glass film according to the embodiment of the present invention.

Further, in the above-mentioned embodiment, the cleaving apparatus 1 is used for so-called primary cutting processing involving the steps from forming of the band-like glass film 2 to rolling of the band-like glass film 2, but the present invention is not limited thereto. For example, as illustrated in FIG. 4, the cleaving apparatus 1 may be used for so-called secondary cutting processing involving further cleaving of a band-like glass film 2' in a rolled state. The band-like glass film 2' to be cleaved by the cleaving apparatus 1 is unrolled from an unrolling device 11 while removing the band-like protective film 7, and is cleaved into a new available film portion 2a' and selvage portions 2b'. Other respects than the above are substantially the same as in the above-mentioned embodiment, and hence similar components are represented by the same reference symbols to omit description thereof.

EXAMPLE 1

In the structural example of the cleaving apparatus illustrated in FIG. 4, a roll of the band-like glass film 2' having a thickness of 70 μm, a width of 800 mm, and a length of 200 m was mounted onto the unrolling device 11, and the band-like glass film 2' was cut and separated into the available film portion 2a' having a width of 600 mm and the selvage portions 2b' situated at both ends of the band-like glass film 2' and each having a width of 100 mm. The available film portion 2a' was rolled by the roll-up device 8. The air blow port had a dimension of 1,000 mm in the width direction of the band-like glass film, and 0.5 mm in the conveyance direction of the band-like glass film. Further, the total flow rate of air to be supplied was 1,000 l/min, and the flow rate per unit area (1 mm$^2$) of the air supply port of the air knife 5 was 2 l/min. Further, the inclination angle θ was 45°, the distance L was 500 mm, and the height H was 10 mm. As a result of performing laser cleaving on the band-like glass film 2' under the conditions described above, the band-like glass film 2' was successfully cut along its entire length, and the available film portion 2a' was successfully rolled. Further, the maximum value of a standard deviation value of a meandering amount in the cleaved surface of the available film portion 2a' was 15 μm.

The standard deviation value of the meandering amount in the cleaved surface of the available film portion 2a' was calculated in the following manner. First, both end portions of the available film portion 2a' were each photographed using a CCD camera from a thickness direction of the available film portion 2a' while conveying the available film portion 2a'. Subsequently, the photographed image was divided into 30-mm lengthwise regions of the available film portion 2a'. For each divided image, the standard deviation value was calculated based on a difference between an average position and each position of all pixels in the width direction of the available film portion 2a', the pixels including an end surface (cleaved surface) of the available film portion 2a'. Note that, the 30-mm lengthwise region of the available film portion 2a' in the image photographed by the CCD camera is divided into 1,600 pixels. As for the width direction, the photographed image is divided into 1,200 pixels.

As a comparative example, laser cleaving was performed on the band-like glass film 2' under the same conditions as in the above-mentioned example, except that the air knife 5 was not used. As a result, when the band-like glass film 2' was cleaved in a region of about 35 m in length, the crack in the cleaving region R was propagated in the width direction of the band-like glass film 2'. Then, the available film portion 2a' was cut in the width direction and the cleaving stopped. Further, the maximum value of the standard deviation value of the meandering amount in the cleaved surface of the available film portion 2a', which was cleaved into a width of 600 mm before the cleaving stopped, was 132 μm.

As is apparent from the comparison between the result of the example and the result of the comparative example, the cleaving apparatus for a band-like glass film and the cleaving method for a band-like glass film according to the example of the present invention have effectively suppressed the situation that the wavy portions reach the cleaving region R, in which the band-like glass film 2' is to be cleaved.

The present invention is not limited to the above description, and various modifications maybe made within the scope of the technical idea thereof.

REFERENCE SIGNS LIST 1 cleaving apparatus for band-like glass film
2, 2' band-like glass film
3 conveyor (support means)
5 air knife (air supply means)
9 air float device (air supply means)
10 air float table (support means)
R cleaving region

The invention claimed is:

1. A cleaving apparatus for a band-like glass film, which is configured such that the band-like glass film, which is being conveyed in a longitudinal direction thereof, is cleaved along a conveyance direction thereof using a thermal stress generated through localized heating and cooling of a heated region resulting from the localized heating, the localized heating and the cooling being performed on a preset cleaving line extending along the conveyance direction of the band-like glass film,
the cleaving apparatus comprising:
support means for supporting a back surface side of the band-like glass film;
air supply means for supplying air during conveying of the band-like glass film to a front surface of the band-like glass film, while the back surface side of the band-like glass film is supported by the support means, to retain the band-like glass film on the support means at a position upstream of a cleaving region in the conveyance direction, the cleaving region being a region in which the band-like glass film is to be cleaved; and
a roll-up device by which at least a part of the band-like glass film that has been cleaved is rolled,
wherein the band-like glass film is cleaved during the conveying of the band-like glass film along the conveyance direction using the thermal stress after being retained on the support means.

2. The cleaving apparatus for a band-like glass film according to claim 1, wherein the air supply means supplies the air having a width that is larger than a width of the band-like glass film.

3. The cleaving apparatus for a band-like glass film according to claim 1, wherein the air supply means comprises an air knife.

4. The cleaving apparatus for a band-like glass film according to claim 1, wherein the air supply means blows the air in a direction from a position spaced away from the front surface of the band-like glass film on a downstream side in the conveyance direction of the band-like glass film toward a position on the front surface of the band-like glass film on an upstream side in the conveyance direction of the band-like glass film.

5. The cleaving apparatus for a band-like glass film according to claim 1, wherein the support means comprises an air float table.

6. A cleaving method for a band-like glass film, in which the band-like glass film, which is being conveyed in a longitudinal direction thereof, is cleaved along a conveyance direction thereof using a thermal stress generated through localized heating and cooling of a heated region resulting from the localized heating, the localized heating and the cooling being performed on a preset cleaving line extending along the conveyance direction of the band-like glass film,
the cleaving method comprising:
supporting, by support means, a back surface side of the band-like glass film;
supplying, by air supply means, air during conveying of the band-like glass film to a front surface of the band-like glass film, while the back surface side of the band-like glass film is supported by the support means, to retain the band-like glass film on the support means at a position upstream of a cleaving region in the conveyance direction, the cleaving region being a region in which the band-like glass film is to be cleaved; and
rolling, with a roll-up device, at least a part of the band-like film that has been cleaved,
wherein the band-like glass film is cleaved during the conveying of the band-like glass film along the conveyance direction using the thermal stress after being retained on the support means.

7. The cleaving apparatus for a band-like glass film according to claim 2, wherein the air supply means comprises an air knife.

8. The cleaving apparatus for a band-like glass film according to claim 2, wherein the air supply means blows the air in a direction from a position spaced away from the front surface of the band-like glass film on a downstream side in the conveyance direction of the band-like glass film toward a position on the front surface of the band-like glass film on an upstream side in the conveyance direction of the band-like glass film.

9. The cleaving apparatus for a band-like glass film according to claim 3, wherein the air knife blows the air in a direction from a position spaced away from the front surface of the band-like glass film on a downstream side in the conveyance direction of the band-like glass film toward a position on the front surface of the band-like glass film on an upstream side in the conveyance direction of the band-like glass film.

10. The cleaving apparatus for a band-like glass film according to claim 7, wherein the air knife blows the air in a direction from a position spaced away from the front surface of the band-like glass film on a downstream side in the conveyance direction of the band-like glass film toward a position on the front surface of the band-like glass film on an upstream side in the conveyance direction of the band-like glass film.

11. The cleaving apparatus for a band-like glass film according to claim 2, wherein the support means comprises an air float table.

12. The cleaving apparatus for a band-like glass film according to claim 3, wherein the support means comprises an air float table.

13. The cleaving apparatus for a band-like glass film according to claim 4, wherein the support means comprises an air float table.

14. The cleaving apparatus for a band-like glass film according to claim 7, wherein the support means comprises an air float table.

15. The cleaving apparatus for a band-like glass film according to claim 8, wherein the support means comprises an air float table.

16. The cleaving apparatus for a band-like glass film according to claim 9, wherein the support means comprises an air float table.

17. The cleaving apparatus for a band-like glass film according to claim 10, wherein the support means comprises an air float table.

18. The cleaving apparatus for a band-like glass film according to claim 1, further comprising a thermal stress cleaving device that cleaves the band-like glass film during the conveying of the band-like glass film along the conveyance direction using the thermal stress.

19. The cleaving method for a band-like glass film according to claim 6, further comprising cleaving, with a thermal stress cleaving device, the band-like glass film during the conveying of the band-like glass film along the conveyance direction using the thermal stress.

\* \* \* \* \*